United States Statutory Invention Registration [19]

[11] Reg. Number: H92

Kretschmer, Jr. et al. [45] Published: Jul. 1, 1986

[54] GENERALIZED ADAPTIVE MTI SYSTEM

[75] Inventors: Frank F. Kretschmer, Jr., Laurel, Md.; Bernard L. Lewis, Satellite Beach, Fla.

[73] Assignee: United States of America, Washington, D.C.

[21] Appl. No.: 778,834

[22] Filed: Sep. 23, 1985

[51] Int. Cl.[4] ..... G01S 13/52; H01Q 3/22

[52] U.S. Cl. ..... 343/7.7; 343/375; 343/5 CE

[56] References Cited

U.S. PATENT DOCUMENTS

| | | |
|---|---|---|
| 4,086,592 | 4/1978 | Lewis et al. . |
| 4,222,051 | 9/1980 | Kretschmer, Jr. et al. . |
| 4,390,881 | 6/1983 | Lewis et al. . |
| 4,439,770 | 3/1984 | Lewis et al. . |
| 4,459,700 | 7/1984 | Kretschmer, Jr. et al. . |
| 4,464,768 | 8/1984 | Lewis et al. . |

OTHER PUBLICATIONS

Monzongo et al., Publication from Hughes Aircraft Co., Fullerton, California, "Introduction to Adaptive Arrays", p. 365.

Kretschmer, Jr. et al., "Adaptive MTI and Doppler Filter Bank Clutter Processing", Proceedings of the IEEE, National Radar Conference, Mar. 13–14, 1984, pp. 69–73.

*Primary Examiner*—S. C. Buczinski
*Assistant Examiner*—Linda J. Wallace
*Attorney, Agent, or Firm*—Robert F. Beers; William T. Ellis

[57] ABSTRACT

An adaptive N-pulse MTI processor for obtaining optimum clutter cancellation with a minimum of hardware, comprising a first input pulse line; first delay means for providing an interpulse delay T to pulses on this first input line; a first adaptive canceller with its auxiliary input connected directly to take pulses from the first input line, and with its main input connected to take delayed pulses from the first delay means; and N−2 series-connected canceller circuits, with each canceller circuit associated with a different level of pulses. The nth canceller circuit, where $1 \leqq n \leqq N-2$, includes an nth adaptive canceller; an nth input pulse line; n series connected delay means for providing a series of interpulse delays T to pulses propagating on the nth input pulse line, and with n+1 terminals for taking pulse outputs in front of each of the n delay means and after the last of the n delay means; and nth commutating switch means with a plurality of switch positions connected for applying pulses from the n+1 terminals to the main and auxiliary inputs of the nth adaptive canceller. The commutating switch means operates to provide appropriate sets of two pulses from the n+1 terminals to the main and auxiliary inputs to effect the n+2 canceller level of Gram-Schmidt pulse decorrelation on the output line of the nth canceller. The output from the n=1 adaptive canceller is connected to the first input pulse line. The output from the first adaptive canceller then provides the Gram-Schmidt decorrelation. With this configuration, only N−1 cancellers are required to implement the optimum Gram-Schmidt decorrelation for an N-pulse MTI.

5 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CANONICAL MTI STRUCTURE

GENERALIZED ADAPTIVE MTI SYSTEM

BACKGROUND OF THE INVENTION

The present invention relates generally to improvements in signal processing systems, and more particularly to improved techniques and designs for eliminating interference or otherwise undesirable signal components from serial data samples to be processed by a moving target indicator type radar system.

As is well known in the art, desired information received by a communication, sonar or a radar system is frequently not isolated by itself, but is found in the presence of unwanted signals. These unwanted signals typically vary much more slowly with time than the desired signals. Thus, these unwanted signals generally are correlated from data pulse sample to data pulse sample. With specific respect to a moving target indication radar system, radar echos from non or slowly moving radar reflectors such as ground clutter, sea returns, and reflections from wind driven interference such as rain and chaff, all generate echos which have frequency components which are relatively slowly changing withg respect to a moving target. Thus, the echos from this radar clutter are correlated between successive radar pulse samples, i.e., these echo components appear the same in adjacent data pulse samples. Accordingly, since rapidly moving reflectors, i.e., targets, do not correlate from data sample to data sample, it is possible to significantly enhance the moving target signal by removing the correlated signal components resulting from sea, ground, rain, and chaff echos.

Prior art MTI systems utilize cancellers in order to decorrelate the output of a data pulse sample from an adjacent data sample. The typical 2-pulse adaptive canceller operates to phase shift and amplitude weight one of the data samples, and then to subtract this phase shifted and weighted data sample from another of the data samples. Such systems work well to eliminate correlated interference when only one narrowband interference source is present. However, when multiple and/or wideband interference sources are involved, a multiple degree-of-freedom system is needed to cancel the correlated components of the data samples. Theoretically, if N independent interference sources are present in a signal environment, the interference signals may be cancelled by multiple cancellers fed by inputs from separate data sample pulses. In practice, however, it has been found that effective cancellation cannot be obtained unless the data pulse sample inputs are independent, i.e., decorrelated from one another, in order to prevent the reintroduction of signals which have been cancelled in a previous canceller's circuit.

A typical prior art adaptive moving target indicator system for providing optimum clutter cancellation utilizing independent auxiliary data samples, requires N(N-1)/2 cancellers, where N is the number of pulses used in the MTI. A prior art MTI structure of this type is shown in FIG. 1. This configuration utilizes Gram-Schmidt processing using series iterative cancellation. FIG. 1 is broken up by means of dashed lines in order to show a 2-pulse canceller configuration, a 3-pulse canceller configuration, a 4-pulse canceller configuration, and a 5-pulse canceller configuration. The extension to higher order configurations is clear. A standard tapped delay line 10 is utilized in order to obtain multiple data samples. Each delay line provides a delay equal to the interpulse delay T between radar pulse. Accordingly, for a 2-pulse cancellation system, a radar pulse return signal is applied from the terminal 14 directly to the auxiliary input of canceller 16 and indirectly through an interpulse delay element 12 to the main input of the canceller 16. The result of this cancellation for a series of pulse samples numbered consecutively 1, 2, 3, 4, . . . is obtained on line 18 and, for the first two pulses numbered 1 and 2, is equal to $1\perp 2=A$, i.e., the components of the pulse sample 1 that are perpendicular to the components of pulse sample 2, or more succinctly stated, pulse sample 1 decorrelated from pulse sample 2. The 2-pulse canceller is sufficient to cancel one source of narrowband interference.

In order to cancel additional or wideband sources of interferecne, 3-, 4-, and 3-pulse cancellers are utilized. In FIG. 1, a 3-pulse canceller is formed by adding a second interpulse delay segment 20 in conjunction with a second canceller 22 and a third canceller 24. In operation, pulses are applied from the terminal 26 in the delay line 10 directly to the main input of the canceller 22 and then indirectly through the interpulse delay element 20 to the auxiliary input of the canceller 22. The resulting output from the canceller 22 is pulse 3 decorrelated with pulse 2 and is represented as $3\perp 2=B$. B is then applied on the line 30 to the auxiliary input to the canceller 24. The ouput A on line 18 is applied to the main input of the canceller 24. The output from the canceller 24 on line 32 is A decorrelated from B and is represented by $A\perp B$. In order to obtain a 4-pulse canceller, a third interpulse delay element 34 is utilized in the delay line 10 and three additional cancellers 36, 38, and 40 are included. In operation, pulses are taken from the terminal 42 in the delay line and are applied directly to the main input of the canceller 36. The signal at point 14 in the delay line is applied via the line 44 to the auxiliary input to the canceller 36. In the example shown in the figure, pulse 2 in the pulse sequence is applied to the auxiliary input of the canceller 36 while pulse 4 is applied directly to the main input of the canceller 36. The result is pulse 4 decorrelated from pulse 2 and is represented by $4\perp 2=C$ on line 48. C is then applied to the main input for the canceller 38. B from the canceller 22 on line 30 is applied to the auxiliary input for the canceller 38. The resulting output from the canceller 38 is on line 50 and is C decorrelated from B and is represented by $C\perp B$. $C\perp B$ is applied via the line 52 to the auxiliary input to the canceller 40. The signal on line 32, $A\perp B$, is applied to the main input of the canceller 40. The resulting output from the canceller 40 is on line 54 and is $(A\perp B)\perp(C\perp B)$.

Finally for a 5-pulse canceller, a fourth interpulse delay element 60 is utilized in the delay line in conjunction with the additional cancellers 62, 64, 66, 68. The fifth pulse is applied from the terminal 70 directly to the main input of the canceller 62. Pulse 2 from terminal 14 in the delay line is applied via the line 71 to the auxiliary input to the canceller 62. The resulting output from the canceller 62 is found on line 72 and is pulse 5 decorrelated from pulse 2 and is represented by $5\perp 2=D$. The output from the canceller 62, i.e., D, is applied to the main input of the canceller 64. The output B on line 30 from the canceller 22 is applied to the auxiliary input of the canceller 64. The resulting output from the canceller 64 is found on line 74 and is D decorrelated from B and is represented $D\perp B$. The output $D\perp B$ is applied to the main input of the canceller 66. The output $C\perp B$ on line 52 from the canceller 38 is applied to the auxiliary input for the canceller 66. The resulting output from the canceller 66 is found on line 76 and is $(D\perp B)\perp(C\perp B)$. This output on the line 76 is applied to the auxiliary input to the canceller 68. The output $(A\perp B)\perp(C\perp B)$ is applied on line 54 to main input to the canceller 68. The resulting output from the 5-pulse canceller is found on line 80 and is $[(A\perp B)\perp(C\perp B)]\perp[(D\perp B)\perp(C\perp B)]$.

It can be seen from the above discussion of FIG. 1 that in order to obtain optimum clutter cancellation, a significant number of cancellers are required. In this regard, as the number of pulses in the pulse cancellation system increases, the number of required cancellers rapidly increases, i.e., $N(N-1)/2$ cancellers are required for N pulses. In the example shown in FIG. 1 for a 5-pulse MTI, 10 cancellers are required. This large number of cancellers required to obtain an optimum clutter cancellation is so costly that it is essentially impractical.

OBJECTS OF THE INVENTION

Accordingly, it is an object of the present invention to provide an optimum clutter cancellation with a minimum of hardware and cost.

It is a further object of the present invention to significantly simplify the implementation of an optimum multiple-pulse adaptive MTI processor.

Other objects, advantages, and novel features of the present invention will become apparent from the detailed description of the invention, which follows the summary.

SUMMARY OF THE INVENTION

Briefly, the present invention comprises an adaptive N pulse MTI processor for obtaining optimum clutter cancellation with a minimum of hardware, comprising a first input pulse line; first delay means for producing an interpulse delay T to pulses on the first input line; a first adaptive canceller with a main and auxilliary inputs and an output line, with the auxiliary input connected directly to take pulses from the first input line, and with the main input connected to take delayed pulses from the first delay means, the first adaptive canceller for decorrelating a signal applied to the main input from a signal applied to the auxiliary input and generating a residue signal on the output line thereof; $N-2$ series connected canceller circuits, with each canceller circuit associated with a different number of pulses, with the nth canceller circuit, where $1\leqq n\leqq N-2$, including an nth adaptive canceller, with a main and an auxiliary inputs, and an output line, for decorrelating a signal applied to the main input from a signal applied to the auxiliary input and generating a residue signal on the output line; an nth input pulse line; n series connected delay means for providing a series of interpulse delays T to pulses propagating on the nth input pulse line, and with $n+1$ terminals for taking pulse outputs in front of each of the n delay means and after the last of the n delay means; nth commutating switch means with a plurality of switch positions connected for applying pulses from the $n+1$ terminals to the main and auxiliary inputs of the nth adaptive canceller, with the nth commutating switch operating to provide appropriate sets of two pulses from the $n+1$ terminals to the main and auxiliary inputs to effect one canceller level of Gram-Schmidt pulse decorrelation on the output line of the nth canceller; wherein the output line for the nth adaptive canceller is connected to the $n-1$ input line for the $n-1$ canceller circuit, and wherein the $n=1$ canceller circuit has the output line from its adaptive canceller connected to the first input line, and wherein the output line for the first adaptive canceller provides the full Gram-Schmidt pulse decorrelation output.

In a preferred embodiment, the adaptive cancellers utilized in the present design are digital adaptive cancellers.

DETAILED DESCRIPTION OF THE PREFERRED EMBODIMENT

The present invention discloses an adaptive N pulse MTI processor for obtaining optimum clutter cancellation with a minimum of hardware. This invention, for an N-pulse MTI, places $N-1$ cancellers or pulse decorrelators in series, and utilizes a plurality of tapped delay lines for obtaining pulse samples along with a plurality of commutating switchs for providing the proper pulses from the tapped delay lines to the main and auxiliary inputs of the individual cancellers. In particular, for each canceller except one, there is a set of at least two switches for providing the proper pulse inputs to that canceller's main and auxiliary inputs. The logic utilized in the present design permits optimum clutter cancellation with only $N-1$ cancellers instead of $N(N-1)/2$ cancellers as required in the prior art.

Figure 2:
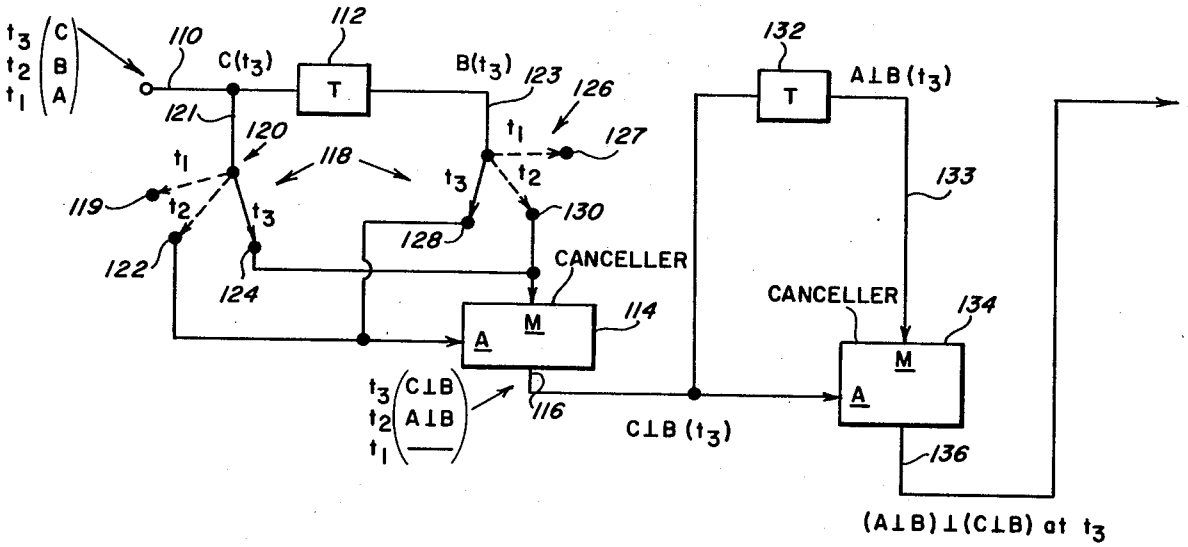
FIG. 2 is a schematic block diagram of one embodiment of a 3-pulse MTI in accordance with the present invention.

Before discussing the logic of FIG. 2 in detail, a brief discussion will be provided of the operation of a standard canceller or pulse decorrelator. The MTI operating assumption is that a moving target will provide a small echo amplitude and be in just one range cell. Accordingly, there should be no correlation of the target echo pulse between adjacent pulse samples. In contrast, ground clutter, waves, chaff, and wind driven interference provide echos which change very slowly in amplitude and phase relative to the moving target echos. Accordingly, these clutter echos will correlate from pulse to pulse. The purpose of the canceller is to subtract various sets of pulses in order to reduce this correlated clutter to zero. The basic equation for the canceller is $R=M-WA$, where R is the residue remaining after the cancellation process, M is the signal applied to the main input of the canceller, A is the signal applied to the auxiliary input of the canceller, and W is the weight which is to be multiplied with the auxiliary signal A in order to cause WA to approach the value of the main signal M and reduce R to zero. The weight W is obtained by averaging over a series of n range cells and is set up primarily on the clutter echos. Typically, it is desired to minimize the power of the residue R in the least squares sense. This minimization is accomplished via the orthogonality principal, i.e., that R should be orthogonal to $A^*$, the complex conjugate of A. This orthogonality results in the equation $RA^*=0$, which must be averaged because this is a random process. The weight W can be obtained by first taking the standard canceller equation $R=M-WA$, then multiplying this equation by $A^*$ to yield the following equation $\overline{RA^*}=\overline{MA^*}-W\,\overline{AA^*}$. This equation is then solved for W to yield the following equation: $W=\overline{MA^*}/\overline{AA^*}$. In essence, the weight W changes the amplitude and the phase of the auxiliary signal A to make the residue R perpendicular to the auxiliary signal A. Equivalently, the residue comprises the component of the main signal M that is perpendicular to the auxiliary signal A.

Referring now to FIG. 2, there is shown one embodiment of a 3-pulse adaptive MTI in accordance with the present invention. Given three consecutive pulses A, B, C, with adjacent pulses separated by the radar interpulse period, the purpose of this design is to provide the Gram-Schmidt decorrelation $(A\perp B)\perp(C\perp B)$ with a minimum number of adaptive cancellers, i.e., $N-1$, or in this case, two cancellers. The circuit includes a first input pulse line 110, a first delay means 112 for providing an interpulse delay T to pulses on the input line 110, and a first adaptive canceller 114 with a main input M and an auxiliary input A and an output line. The first adaptive canceller 114 operates to decorrelate a signal applied to the main input M from a signal applied to the auxiliary input and to generate a residue signal on its output line 116. A switching means 118 with a plurality of switch positions is connected for applying a pulse from before the first delay means 112 and a pulse from after the first delay 112 to the auxiliary and main inputs, respectively, of the first canceller 114, at one switch postion, and to the main auxiliary inputs, respectively, of the first canceller 114, on the next consecutive switch position. Thus, for the three consecutive pulses A, B, C, the first canceller 114 generates on its output line consecutively $A\perp B$ and then $C\perp B$. A second delay means 132 is included for providing an interpulse delay T to pulses on the output line 116 of the first canceller 114. A second adaptive canceller 134 with a main input M, an auxiliary input A, and an output line 136 is provided for decorrelating a signal applied to the main input M from a signal applied to the auxillary input A and then generating a residue signal on the output line 136. The auxiliary input A is directly connected to the output line 116 of the first canceller 114. The main input of the canceller 134 is connected to take delayed pulses from the output line 133 of the second delay means 132.

The two delay means 112 and 132 may be implemented by any standard delay device which is capable of providing a delay equal to the radar interpulse period. By way of example, such delay means may comprise shift registers, or standard delay line elements.

The first and second cancellers 114 and 134 may be implemented by a variety of analog or digital cancellers. By way of example, an analog closed loop canceller, such as the Howells-Applebaum canceller, or the digital open loop cancellers disclosed by Lewis and Kretschmer, Jr. in U.S. Pat. No. 4,086,592, may be utilized.

The switching means 118 may take a variety of configurations in the present design. In the embodiment shown in FIG. 2, the switching means comprises a commutating switch 120 and a commutating switch 126. By way of example, these switches may be implemented by single pole double-throw switches that throw between pulse echo returns. The commutating switch 120 has its pole connected via line 121 to the input line 110 and includes three switch positions: position 119, a dummy terminal; position 122 connected to the auxiliary input of the canceller 114; and position 124 connected to the main input of the canceller 114. The commutating switch 126 has its pole is connected to the output line 123 from the first delay means 112 and has three switch positions 127, 128, and 130. Switch position 127 is a dummy position. Switch position 128 is connected to the auxiliary input of the canceller 114. Switch position 130 is connected to the main input of the canceller 114. These switches are designed to throw or commutate on every pulse transmission.

It should be noted that the switch position shown in FIG. 2 comprises only one of many switch configurations which could be utilized to implement the switching means 118. By way of example, it is possible to reverse the switch configuration such that the pole of the switch 120 is connected directly to the auxililary input of the canceller 114 and has two switch positions connected to the lines 121 and 123, respectively. Likewise, the pole of the switch 126 could be connected directly to the main terminal of the canceller 114 and could include two switch positions connected to the lines 121 and 123, respectively.

In FIG. 2, the pulse signals A, B, and C are shown as being applied to the line 110 at the times $t_1$, $t_2$, and $t_3$, respectively. The time difference between any two adjacent times is the radar interpulse delay period T. It can be seen that the first pulse A is available on the line 110 at time $t_1$. One interpulse delay period T later, the second echo pulse B arrives at the line 110 and the first echo pulse A is now available on the output line 123 for the first delay means 112. At this time $t_2$, the switches 120 and 126 are in the positions labelled $t_2$ in order to provide the B pulse echo to the auxiliary input of the canceller 114 via the switch position 122 and to provide the A pulse echo to the main input of the canceller 114 via the switch position 130. Accordingly, the output from the canceller 114 at the time $t_2$ is A decorrelated from B, i.e., $A\perp B$. The output $A\perp B$ is applied to the second interpulse delay means 132. One interpulse period T later, i.e., at the time $t_3$, the pulse echo C is now on line 110 and the pulse echo B is available on line 123. Likewise, because the switches 120 and 126 throw or commutate on every pulse transmission, the switches 120 and 126 are now in their solid arrow $t_3$ positions, such that the echo pulse C is applied to the main terminal of the canceller 114 via the switch position 124, while the echo pulse B is applied to the auxiliary input of the canceller 114 via the switch position 128. Accordingly, at time $t_3$, the output line 116 from the canceller 114 provides pulse C decorrelated from pulse B, i.e., $C\perp B$. This output $C\perp B$ is applied directly via the line 116 to the auxiliary input of the canceller 134. The previous output on line 116 at time $t_2$, i.e., $A\perp B$, is now available on the output line 133 of the second delay means 132. Accordingly, the output $A\perp B$ is applied via the line 133 to the main input of the canceller 134. The output of the canceller 134 on line 136 is then $(A\perp B)\perp(C\perp B)$ at the time $t_3$. Note that this output is identical to that of prior art Gram-Schmidt adaptive MTI cancellers but requires only two adaptive cancellers instead of the three adaptive cancellers required previously. It should be noted that the above described output on line 136, in essence, is the echo pulse A decorrelated from the echo pulse B and from that part of the echo pulse C which is decorrelated from the echo pulse B, i.e., all new information.

It should be noted that in the embodiment of FIG. 2, 3-pulse sequences are used in the processing. Because an initial pulse time $t_1$ is used in each sequence to read pulse samples on to the line 110 for the circuit, the dummy switch positions 121 and 127 are included on the switches 120 and 127, respectively, in order to provide for proper 3-pulse synchronization for these switches.

Note that there are switching configurations where dummy switch positions may not be necessary.

From the above, it can be seen that optimum clutter cancellation has been obtained for an N pulse adaptive MTI while employing only N−1 cancellers. This scheme has been accomplished with only the added cost of a pair of switches, thus significantly reducing the cost of the device while maintaining optimum performance.

Figure 1:
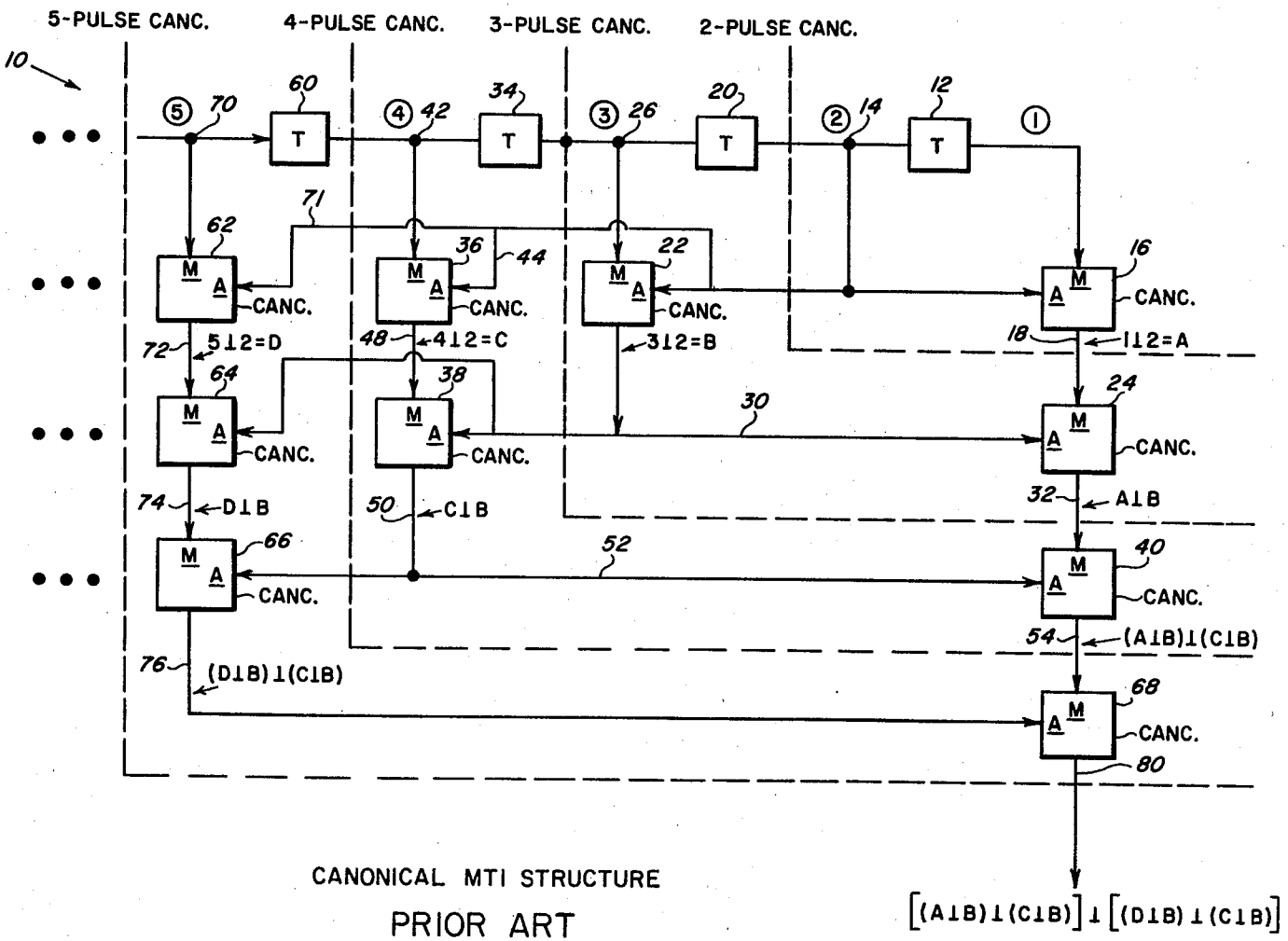
PRIOR ART FIG. 1
FIG. 1 is a schematic block diagram of a prior art canonical moving target indicator (MTI) structure.
Figure 3:
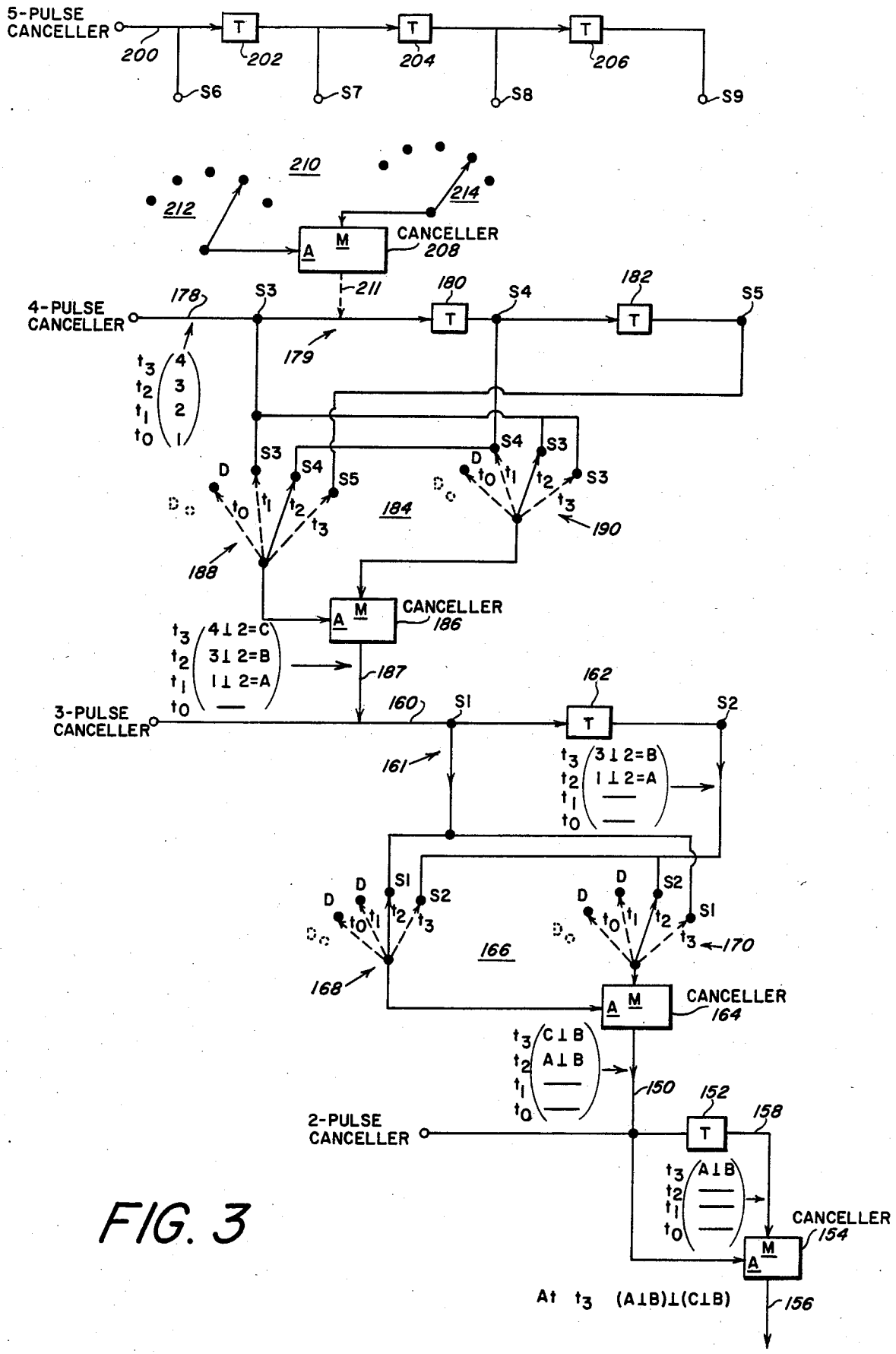
FIG. 3 is a schematic block diagram of a preferred embodiment of the present invention.

Referring now to FIG. 3, there is shown an embodiment of the present invention extended to higher order canceller configurations. The precise canceller configuration shown in FIG. 3 is a four-pulse canceller. However, some of the circuitry for a 5-pulse canceller is also included in this figure to illustrate of the higher order extension of the present invention. In this configuration, it should be noted that only one canceller is required per horizontal Gram-Schmidt level of cancellers. In this context, a horizontal level of cancellers is of the type shown in FIG. 1 wherein there are four separate horizontal levels of cancellers to implement the 5-pulse MTI structure. Accordingly, the present invention for a N pulse adaptive MTI requires only N−1 cancellers rather than N(N−1)/2 cancellers, as in the prior art.

Referring now to FIG. 3, the system therein comprises a plurality of series-connected cancellers. The first canceller in the series is a 2-pulse canceller and includes a first input pulse line 150 for providing echo pulses or partially decorrelated echo pulses, a first delay means 152, and a first adaptive canceller 154. The first delay means 152 provides an interpulse delay T to the pulses on line 150. The first adaptive canceller 154 has a main and an auxiliary inputs and an output line 156. This canceller 154 again operates in the same manner as the cancellers of FIG. 2 to decorrelate a signal applied to the main input from a signal applied to the auxiliary input and to generate a residue signal on the output line 156. In this configuration, pulses on the first input pulse line 150 are applied directly to the first delay means 152 and to the auxiliary input of the canceller 154. The output on line 158 from the first delay means 152 is applied to the main input of the canceller 154.

For each additional pulse added to the pulse canceller, there will be a separate canceller circuit connected in series thereto. Accordingly, for an N-pulse canceller, there will be N−2 series connected canceller circuits, with each canceller circuit associated with a different number of pulses, where $1 \leqq n \leqq N-2$. Each of these canceller circuits includes an adaptive canceller with a main and an auxiliary input and an output line, a plurality of tapped delay lines comprising serially connected delay means for providing a series of interpulse delays T, and commutating switch means with a plurality of switch positions connected for applying pulses from taps on the delay line to the main and auxiliary inputs of the adaptive canceller. This commutating switch means operates to provide appropriate sets of two pulses from the tapped delay line to the main and auxiliary inputs to effect one canceller level of Gram-Schmidt pulse decorrelation on the output line of the canceller. Note that the last of these canceller circuits has its output line connected to the first input pulse line 150. The ultimate effect of this circuit operation is to provide the optimum Gram-Schmidt decorrelation on a set of consecutive pulses.

For a 3-pulse canceller, there will be N−2 or one additional canceller circuit. In FIG. 3 this 3-pulse canceller is shown as including an input line 160, a tapped delay line 161 including delay means 162 with tap terminals S1 and S2 on either side thereof, an adaptive canceller 164, and commutating switch means 166. The purpose of the tapped delay line 161 and the commutating switch means 166 is to provide the appropriate adjacent pair of pulses to the main and the auxiliary inputs of the canceller 164. In the particular configuration shown in FIG. 3, the commutating switch means 166 is implemented by two single-pole four-position switches 168 and 170. The switch 168 is connected at its pole to the auxiliary input of the canceller 164, while the pole of the switch 170 is connected to the main input of the canceller 164. It should be noted that this 3-pulse canceller configuration, including the two delay means 162 and 52, the two cancellers 164 and 154, and the two switches 168 and 170, is almost identical to the configuration shown in FIG. 2. However, note that the commutating switch means 166 is slightly different in that the pole positions have been reversed so that the pole for the switch 168 is now connected to the auxiliary input of the canceller 164 while the pole for the switch 170 is now connected to the main input for the canceller 164. Also, there is an additional dummy terminal which will be discussed later.

A 4-pulse canceller is shown as including an additional canceller circuit over that of the 3-pulse canceller. This additional canceller circuit includes an input line 178 and a tapped delay line 179 with two serially-connected delay means 180 and 182 for providing interpulse delays T to pulses propagating thereto. Tap terminals S3, S4, and S5 are provided in front of each delay means and after the last delay means. This additional canceller circuit includes a commutating switch means 184 and an adaptive canceller 186 with a main input, an auxiliary input, and an output line 187. Again, the commutating switch means 184 may comprise two single pole multi-position switches 188 and 190 for providing pairs of echo pulse samples to the auxiliary and the main inputs of the canceller 186. The output line 187 of the canceller 186 is applied to the input line 160 for the 3-pulse canceller.

For purposes of explanation of the 4-pulse canceller, the input echo pulses applied on the input pulse line 178 are numbered consecutively as 1, 2, 3, and 4, and occur at the times $t_0$, $t_1$, $t_2$, and $t_3$, respectively.

In the embodiment shown in FIG. 3, each of the switches 188 and 190 is shown as including four switch positions, one for each of the pulses applied onto line 178. These four switch positions ensure that the individual switches will commutate in proper synchronism such that after a 4-pulse sequence, the switch will be at its first position again. In this regard, the switch 188 has a dummy terminal D which will be connected to the pole of the switch at time $t_0$, a position S3 which is connected to the terminal S3 on delay line 179 and is connected to the pole of the switch at time $t_1$, a switch position S4 which is connected to the terminal S4 in the delay line 179 and is connected to the pole of the switch at time $t_2$, and finally a switch position S5 which is connected to the terminal S5 in the delay line 179 and is connected to the pole of the switch at time $t_3$. Likewise, the switch 190 has a dummy switch position D which is connected to the pole of the switch at time $t_0$, a switch position S4 which is connected to the terminal S4 in the delay line 179 and is connected to the pole of the switch at time $t_1$, a switch position S3 which is connected to the terminal S3 in the delay line 179 and is connected to the pole of the switch at time $t_2$, and finally the switch position S3 which is connected to the terminal S3 in the delay line 179 and is connected to the pole of the switch at time $t_3$. These switch configurations with the timing synchronism noted result in the following outputs on the output line 187 for the canceller 186: at time $t_1$ the output $1\perp 2=A$; at time $t_2$ the output $3\perp 2=B$; and at time $t_3$ the output $4\perp 2=C$.

These outputs A, B, and C are applied via the output line 187 to the input line 160 for the 3-pulse canceller. These outputs are applied directly and by way of the delay means 162 to the auxiliary and main inputs of the canceller 164. Again, the commutating switch means 166 determines which pair of pulses are applied to the auxiliary and main inputs of the canceller 164. In this regard, the switch 168 has four switch positions D, D, S1, and S2. The first switch position D is a dummy switch position and is connected to the pole of the switch at time $t_0$. The second switch position D is again a dummy switch position and is connected to the pole of the switch time $t_1$. The switch position S1 is connected to the terminal S1 in the delay line 161 and is connected to the pole of the switch 168 at time $t_2$. The switch position S2 is connected to the terminal S2 in the delay line 161 and is connected to the pole of the switch 168 at time $t_3$. Likewise, the switch 170 has four switch positions D, D, S2, and S1. The first switch position D is a dummy switch position and is connected to the pole of the switch 170 at time $t_0$. The second switch position D is again a dummy position and is connected to the pole of the switch at $t_1$. The third switch position S2 is connected to the terminal S2 in the delay line 161 and is connected to the pole of the switch 170 at time $t_2$. The fourth switch position $S_1$ is connected to the terminal S1 on the delay line 161 and is connected to the pole of the switch 170 at the time $t_3$. As noted above, the pole of the switch 170 is connected to the main input of the canceller 164 while the pole of the switch 168 is connected to the auxiliary input of the canceller 164.

With the above described switch configuration and utilizing the timing described, the following outputs are obtained on the input line 150 for the canceller 164: at time $t_2$ the output $A\perp B$; at the time $t_3$ the output $C\perp B$.

Accordingly, it can be seen that at time $t_3$ the output $C\perp B$ will be available at the auxiliary input to the canceller 154 via the line 150, while the output $A\perp B$ will be available at the main input of the canceller 154 via the delay means 152 and the output line 158. Thus, at time $t_3$ the canceller 154 will provide the output $(A\perp B)\perp(C\perp B)$. This output is the optimum Gram-Schmidt output, as described previously.

From the above description, it is clear how the present invention can be extended to higher order canceller configurations of 5-pulse cancellation and above. Each additional pulse would include its own canceller circuit level. Each such canceller circuit level would include an nth input pulse line, wherein for that level n would be equal to N-2, an nth adaptive canceller, n series connected delay means for providing a series of interpulse delays T to pulses propagating on the nth input pulse line, and with n+1 tapped terminals for taking pulse outputs in front of each of the end delay means and after the last of the n delay means, and nth commutating means with a plurality of switch positions connected for applying pulses from the n+1 terminals of the delay means to the main and the auxiliary inputs of the nth adaptive canceller. This commutating switch means operates to provide appropriate sets of two pulses from the n+1 terminals of the series connected delay means to the main and auxiliary inputs to effect the n+2 canceller level of Gram-Schmidt pulse decorrelation on the output line of the nth canceller.

By way of example, for a 5-pulse canceller, there is shown in FIG. 3 an input pulse line 200, n, where n is equal to N−2 or 3 series connected delay means 202, 204, 206, with n+1 terminals S6, S7, S8, and S9 taken from in front of each of the n delay means 202–206 and after the last of the n delay means; an nth adaptive canceller 208, and nth commutating switch means 210. Again, the commutating means may be comprised of two single-pole multi-position switches 212 and 214. Each of these multi-positions switches 212 and 214 includes five switch positions for the five pulses utilized in the 5-pulse canceller. The pole for the switch 212 is connected to the auxiliary input of the canceller 208, while the pole of the switch 214 is connected to the main input of the canceller 208. The output of the canceller 208 is applied via the dash line 211 to the input line 178 for the 4-pulse canceller. For ease of illustration, the switch positions for the switches 212 and 214 are not shown. It should also be noted that some adjustment will be required to the switches 188 and 190 in the 4-pulse canceller level and the switches 168 and 170 in the 3-pulse canceller level. For example, at least one additional dummy terminal must be added to those switches in order to obtain the proper synchronization of these switches for a 5-pulse canceller.

It should also be noted that although the switch configurations shown in FIG. 3 utilize single pole switches with the poles connected to either the auxiliary or the main inputs for the respective cancellers, a variety of other switch configuration could also be used to implement the present invention. By way of example, additional switches could be utilized at each canceller level and the poles for those switches could be connected directly to the terminals of the appropriate delay line.

The present invention has been disclosed in the context of a commutating switch configuration, wherein a pulse is optimally decorrelated in an N-pulse canceller after N pulses. Then a new set of N pulses would be used in order to optimally decorrelate a second pulse. For example, in a 3-pulse canceller the pulses A, B, and C would be required in order to optimally decorrelate a pulse in this configuration. Then three additionally pulses D, E, and F would be required in order to optimally decorrelate the next pulse. Thus, the output on line 136 in FIG. 2 would be read out on every third pulse. This type of configuration is advantageous in that it facilitates the switching to a new frequency every N pulses in order to avoid jammers. This configuration also facilitates the change of the pulse repetition frequency every N pulses. It should noted however, that the present invention could be configured in order to provide optimally decorrelated pulses on every pulse, or after a given number of pulses less than N pulses, after the initial pulses have been loaded into the circuit.

It should be noted that the present invention adaptive MTI and its associated components may be implemented in either analog or digital form.

In the present invention, only one canceller is needed per horizontal level of cancellers in the standard Gram-Schmidt configuration. Thus, for an N pulse adaptive MTI, only N−1 cancellers are required, rather than N(N−1)/2 cancellers as in the prior art. This reduction in the number of cancellers in the system significantly reduces its complexity and its expense while providing optimum clutter cancellation.

Obviously many modifications and variations of the present invention are possible in light of the above teachings. It is therefore to be understood that within the scope of the appended claims, the invention may be practiced otherwise than as specifically described.

What is claimed and desired to be secured by Letters Patent of the United States is:

1. An adaptive N pulse MTI processor for obtaining optimum clutter cancellation with a minimum of hardware, where N is an integer greater than 2, comprising:

a first input pulse line;

first delay means for providing an interpulse delay T to pulses on said first input line;

a first adaptive canceller with a main and auxiliary inputs and an output line, with said auxiliary input connected directly to take pulses from said first input line, and with said main input connected to take delayed pulses from said first delay means, said first adaptive canceller for decorrelating a signal applied to said main input from a signal applied to said auxiliary input and generating a residue signal on said output line;

N−2 series connected canceller circuits, with each canceller circuit associated with a different number of pulses, with the nth canceller circuit, where $1 \leqq n \leqq N-2$, including an nth adaptive canceller, with a main and auxiliary inputs, and an output line, for decorrelating a signal applied to said main input from a signal applied to said auxiliary input and generating a residue signal on said output line;

an nth input pulse line;

n series connected delay means for providing a series of interpulse delays T to pulses propagating on said nth input pulse line, and with n+1 terminals for taking pulse outputs in front of each of said n delay means and after the last of said n delay means;

nth commutating switch means with a plurality of switch positions connected for applying pulses from said n+1 terminals to said main and auxiliary inputs of said nth adaptive canceller, said nth commutating switch means operating to provide appropriate sets of two pulses from said n+1 terminals to said main and auxiliary inputs to effect the n+2 canceller level of Gram-Schmidt pulse decorrelation on the output line of said nth canceller;

wherein the output line for the nth adaptive canceller is connected to the n−1 input line for the n−1 canceller circuit, and wherein the n=1 canceller circuit has the output line from its adaptive canceller connected to said first input line, and wherein the output line for said first adaptive canceller provides the full Gram-Schmidt pulse decorrelation output.

2. An adaptive N-pulse MTI processor as defined in claim 1, wherein said commutating switch means comprises:

a first commutating switch connected to said main input of said nth canceller; and a second commutating switch connected to said auxiliary input of said nth canceller.

3. An adaptive N-pulse MTI processor as defined in claim 1, wherein said first and second commutating switches each have N switch positions.

4. An adaptive multi-pulse MTI processor for obtaining optimum clutter cancellation with a minimum of hardware, comprising:

an input pulse line;

a first delay means for providing an interpulse delay T to pulses on said input line;

a first adaptive canceller with a main input and an auxiliary input, and an output line, for decorrelating a signal applied to said main input from a signal applied to said auxiliary input and generating a residue signal on said output line;

switching means with a plurality of switch positions connected for applying a pulse from before said first delay means and a pulse from after said first delay means to said auxiliary and main inputs, respectively, of said first canceller on one switch position, and to said main and auxiliary inputs, respectively, of said first canceller on the next consecutive switch position, such that for three consecutive pulses A, B, and C, said first canceller generates on its output line consecutively $A \perp B$ and then $C \perp B$;

second delay means for providing an interpulse delay T to pulses on said first canceller output line;

a second adaptive canceller with a main input, an auxiliary input, and an output line, for decorrelating a signal applied to said main input from a signal applied to said auxiliary input and generating a residue signal on said output line, wherein said auxiliary input is directly connected to said first canceller output line and said main input is connected to take delayed pulses from said second delay means, wherein the pulses on said second canceller output line are decorrelated.

5. A method for decorrelating a pulse in a multi-pulse MTI with a minimum of hardware, comprising the steps of:

obtaining three consecutive pulses A, B, and C, separated from each other by the MTI interpulse period T;

applying pulses A and B simultaneouly to the main and auxiliary inputs, respectively, of a single first adaptive canceller;

decorrelating pulse A from pulse B to yield $A \perp B$;

applying pulses C and B simultaneously to said main and auxiliary inputs of said single first adaptive canceller one interpulse period later;

decorrelating C from B to yield $C \perp B$;

applying $A \perp B$ and $C \perp B$ simultaneouly to the main and auxiliary inputs, respectively, of a second single adaptive canceller; and decorrelating $A \perp B$ from $C \perp B$ to yield $(A \perp B) \perp (C \perp B)$.

* * * * *